(12) United States Patent
Hammer

(10) Patent No.: US 10,779,546 B2
(45) Date of Patent: Sep. 22, 2020

(54) METHODS FOR MAKING EDIBLE LEGUME COMPOSITIONS

(71) Applicant: Brian Charles Hammer, Alhambra, CA (US)

(72) Inventor: Brian Charles Hammer, Alhambra, CA (US)

( * ) Notice: Subject to any disclaimer, the term of this patent is extended or adjusted under 35 U.S.C. 154(b) by 142 days.

(21) Appl. No.: 15/725,191

(22) Filed: Oct. 4, 2017

(65) Prior Publication Data

US 2019/0098907 A1    Apr. 4, 2019

(51) Int. Cl.
| | |
|---|---|
| *A21D 13/045* | (2017.01) |
| *A21D 13/40* | (2017.01) |
| *A23L 33/105* | (2016.01) |
| *A23L 2/52* | (2006.01) |
| *A23L 19/00* | (2016.01) |
| *A23L 11/00* | (2016.01) |
| *A23L 33/00* | (2016.01) |
| *A23L 5/10* | (2016.01) |
| *A23L 11/30* | (2016.01) |
| *A23P 30/20* | (2016.01) |
| *A23G 1/04* | (2006.01) |
| *A21D 2/36* | (2006.01) |

(52) U.S. Cl.
CPC .......... *A21D 13/045* (2017.01); *A21D 2/362* (2013.01); *A21D 13/40* (2017.01); *A23G 1/042* (2013.01); *A23L 2/52* (2013.01); *A23L 5/15* (2016.08); *A23L 11/05* (2016.08); *A23L 11/30* (2016.08); *A23L 11/31* (2016.08); *A23L 19/01* (2016.08); *A23L 19/09* (2016.08); *A23L 33/00* (2016.08); *A23L 33/105* (2016.08); *A23P 30/20* (2016.08); *A23V 2002/00* (2013.01)

(58) Field of Classification Search
CPC ..... A21D 13/045; A21D 13/40; A23L 33/105; A23L 2/52; A23V 2002/00
See application file for complete search history.

(56) References Cited

U.S. PATENT DOCUMENTS 6,244,528 B1 * 6/2001 Wallis .................. B02C 9/00
                                                    241/23
2016/0309732 A1 * 10/2016 Gugger ............... A23C 11/106

FOREIGN PATENT DOCUMENTS

| CN | 104222298 | * 12/2014 |
| CN | 105851884 | * 8/2016 |

OTHER PUBLICATIONS

ENglish translation for CN104222298 published Dec. 2014.*
English Translation for CN105851884 published Aug. 2016.*

* cited by examiner

*Primary Examiner* — Anthony J Weier
(74) *Attorney, Agent, or Firm* — Andra M. Vaccaro, Esq.

(57) ABSTRACT

Compositions and methods for producing food and drink products containing milled anthocyanin-rich legumes from the Fabaceae family are shown that may lower the glycemic index, increase the duration of nutritionally-derived energy availability over simple carbohydrates, increase nutritional fiber content, reduce hyperglycemia, hyperinsulinemia, hyperleptinemia, total lipids, and cellular anabolism and energy consumption, and increase cellular catabolism and energy production. Using the methods of the present invention, legumes are milled into microparticulate form to increase nutrient availability and to reduce flatulence and other side-effects associated with prior art anthocyanin extraction techniques. Using a method of the present invention, lectins are significantly deactivated, thereby eliminating or substantially reducing hemagglutination.

13 Claims, No Drawings

METHODS FOR MAKING EDIBLE LEGUME COMPOSITIONS

FIELD OF THE INVENTION

The present invention relates to bread and other edible products using legumes. More particularly, this invention relates to non-grain flour products containing legumes and their methods of preparation.

BACKGROUND OF THE INVENTION

Breads, pastas and other flour-based products form significant parts of the diets of many people. Breads and other flour-based products are conventionally prepared from grain-based flours typically made of wheat, rice, corn, and/or other grain. While all grains provide nutrition, the nutritional benefits of finished products using grain-based flour vary according to the processing methods and parts of the grain that are used. In some wheat flour products, the bran and germ are removed, which decreases the amount of nutrition provided to the consumer. Processed white rice and corn flour similarly may have the bran and germ removed, also decreasing the amount of nutrition provided to the consumer. As a result, eating items made of processed wheat, rice and corn flour may not provide adequate nutrition, such that the consumers may have to consume additional nutrition either by eating additional food or by taking supplements. Nutritional deficiency may cause energy deficiency, creating a sense of sluggishness or a sub-optimal sense of well-being.

In addition, refined white and wheat flours have high glycemic indices and contain high amounts of simple carbohydrates that may be quickly digested and utilized by the body. While refined white and wheat flours may create a rapid burst of energy, that energy may quickly dissipate as the simple carbohydrates are used, failing thereby to contribute to the body's sustainable or longer-term energy. Complex carbohydrates, on the other hand, have significantly lower glycemic indices and longer digestion times, thereby providing the consumer with a significantly longer-lasting or more durable energy supply. Producing consumable products using flours that contain complex carbohydrates may therefore assist in simultaneously stabilizing and increasing the body's energy store when energy is measured in terms of availability over time.

In view of increased consumer interest in a more nutritional diet, there is a need for flours that provide improved nutritional properties that are also especially high in complex carbohydrates. As a result, a few products now use processed legumes. Because food processing (during manufacturing or cooking) modifies physical and chemical properties of food, food-processing methods thus may influence the release and uptake of nutrients from the food matrix flour source and either improve or degrade the nutritional energy benefits to the consumer.

Unprocessed whole dry bean legumes contain more metabolically active compounds known as polyphenols than wheat. Polyphenol compounds generally have positive effects on the consumer, including, without limitation, antioxidant, anti-inflammatory, anti-viral, anti-microbial, and anti-carcinogenic, and aid in providing protection from cardiovascular damage, peripheral capillary fragility prevention, diabetes prevention, and vision improvement.

Unprocessed whole dry bean legumes contain metabolically active compounds known as lectins. Although lectins have positive biological benefits including anti-microbial and anti-HIV activity, lectins may cause a variety of problems, including, without limitation, food allergies and other immune responses in addition to nausea, vomiting, diarrhea, agglutination of blood erythrocytes, damage to the microvilli of absorptive enterocytes in the small intestine, and/or disruption of the consumer's digestion and absorption, thereby causing nutrient deficiencies, etc., as they generally interfere with cell function. Thus, legumes are processed to deactivate the effects of the lectins. Using dry heat to process the legumes is relatively ineffective in removing lectins[4] such that moist heat, such as, but not limited to, boiling, steaming or blanching, at 100° C. or higher for at least 10 minutes is usually required.

As a result, legumes may be processed using a variety of methods. One method is known as soak tank batch processing. In soak tank batch processing, the legumes are soaked for 8-24 hours and then blanched in water at 212° Fahrenheit (100° C.) for 5-10 minutes. Another method involves continuous hydration, in which the legumes are blanched at increasing temperature increments from 145-165, 170, 180, and 195-205° F. (63-74, 77, 82, and 91-96° C., respectively) for 30-60 minutes depending on the type of legume used. Both the batch and continuous hydration methods also usually require a final step in which the blanched legumes are either cooked in brine in sealed cans and/or are continuously blanched over 212° F. (100° C.) in a pressurized vessel. Another method, known as the steam method, requires that the legumes are steam blanched at high temperatures.

Because all of these processes require blanching the legumes at high temperatures for a period of time, high temperature processing degrades and may even destroy legumes' nutrients. One such group of nutrients is anthocyanins, which are the phytochemicals that give many beans their pink, red, blue, purple, and black colors and may alleviate some of the negative effects (such as, without limitation, hyperglycemia, hyperinsulinemia and hyperleptinemia) of foods that are high in simple sugars and simple carbohydrates with high glycemic indices and high in fats. The duration of any thermal treatment also affects anthocyanin concentration. The longer the thermal treatment, the less anthocyanin and lectin remain.

In addition, anthocyanins are significantly concentrated in the legumes' hulls, which is the area of the legume most subject to nutrient leaching. Thus, many of the anthocyanins present in the legumes leach out into the water into which the legumes are processed. During processing, the water in which the legumes have been processed may be discarded, which results in high anthocyanin losses. Thus, a process of using flours that maintains whole legume integrity while lowering lectin content and maintaining anthocyanin content without processing at high temperatures, especially for extended periods, would preserve a much greater proportion of the nutrition available in the legume.

Prior art processing methods using high heat also increase resistant starch. Resistant starch (RS) is starch that escapes digestion in the small intestine and to a significant extent undergoes fermentation in the colon. Because colonic bacteria act on RS like they do on oligosaccharides (discussed following), RS can lead to flatulence. In one study conventional, high-pressure steaming increased the RS of beans 3-5 times as much as the RS in raw beans.

Flatulence is also caused by oligosaccharides, particularly those in the raffinose family of trisaccharides composed of galactose, glucose, and fructose found in beans, certain vegetables, and whole grains. Humans lack α-GAL, the enzyme that breaks these trisaccharides down. As a result, the trisaccharide portion of the beans passes undigested through the stomach and small intestine into the colon, where bacteria possessing this enzyme ferment them. The fermentation produces gases such as carbon dioxide, methane, hydrogen, and hydrogen sulfide, commonly known as flatulence.

The starch content of beans can be much greater than their oligosaccharide content, however, ranging for example from 4 to 13 times more for dry navy, Great Northern, and black beans. Methods that reduce RS and increase the amount of starch digestible in the small intestine, such as disrupting cotyledon cells, starch granules, and cell walls by milling might therefore have a more significant effect on flatulence production than oligosaccharides alone. Currently, because using legumes, mainly cooked whole beans, may cause flatulence, legumes have somewhat of an undesirable reputation, possibly inhibiting their use in spite of their great nutritional value.

SUMMARY OF THE INVENTION

The present invention is a process for creating flours and other food products using beans and other legumes that typically have significantly higher complex carbohydrate content than grains, without substantially sacrificing valuable anthocyanins and other nutritional properties of the legume while at the same time substantially reducing lectin content. In addition, the process and products of the present invention reduce flatulence associated with legumes. In the method of the present invention, raw whole legumes are milled into microparticulates and thereafter used in moist compositions like dough or beverages. In a preferred process of the present invention, legume flour is milled such that the particle size is approximately 1-500 micrometers, or 0.001 to 0.50 mm or at the very least small enough to pass through the pylorus, which transfers liquids and particles less than 1-2 mm in size into the duodenum. The size of the microparticulate is important to maintaining the degree and rate of complex carbohydrate and anthocyanin nutritional effectiveness and reducing lectins present in the legumes.

The microparticulate flour then can be moistened and used to make bread products, non-bread products, or beverages. In a preferred embodiment, if the flour of the present invention is to be used to make certain extruded bread-like products such as tortillas, the moistened flour is then heated so that it reaches a temperature range between 75-90° C. for approximately 5-30 minutes or at a temperature and time necessary to prevent starch gelatinization and retrogradation, while maintaining the anthocyanins and reducing the lectins present in the legumes. In another preferred embodiment, the moistened legume flour is cooked or thermally treated for 1 or ore minutes at temperatures between 75 and 100° C., between 100 and 115° C., between 115 and 140° C., preferably between 75 and 90° C., preferably for 5-30 minutes, in order to deactivate phytohemaglutinins and then optionally cooled to a desired temperature, preferably rapidly, in order to limit anthocyanin loss.

In a preferred embodiment of the present invention, the legumes that are milled are selected from anthocyanin-rich beans known as black beans (*Phaseolus vulgaris*), kidney beans (*Phaseolus vulgaris*), small red beans (*Vigna umbellata*), red and black adzuki beans (*Vigna angularis*), black gram (*Vigna mungo*), black lentils (*Lens culinaris*), black and scarlet runner beans (*Phaseolus coccineus*), and cranberry beans (*Phaseolus vulgaris*), as well as white beans (*Phaseolus vulgaris*) (which include navy, Great Northern, cannellini and white kidney), pinto beans (*Phaseolus vulgaris*), and any other beans rich in complex carbohydrates but poor in anthocyanins, and/or any combination thereof.

DETAILED DESCRIPTION OF THE INVENTION

The present invention is a process for creating flours and other food products using beans and other legumes that typically have significantly higher complex carbohydrate content than grains, without substantially sacrificing valuable anthocyanins and other nutritional properties of the legume while at the same time substantially reducing lectin content. In addition, by using the present invention, the final product will typically contain substantially more nutritional value than prior art conventional commercial bean processing. In addition, the process and products of the present invention reduce flatulence associated with legumes.

The particulate form of anthocyanin-rich legumes provides several other advantages over whole cooked beans, as well. Incorporating legume microparticulates into everyday food products brings the significant nutritional benefits of these legumes to persons who otherwise may consume few, if any, legumes. This is especially important in impoverished and malnourished communities, most notably in economically underdeveloped nations, where nutritional benefit per unit of currency spent on food is extremely important.

For persons who consume only whole cooked beans, adding legume microparticulates to their diet will provide the nutritional benefits lost by cooking the legumes whole. By way of example, and not limitation, wheat- and rice-based diets could be nutritionally improved by adding products made from legume microparticulates without any radical shift in dietary customs. Likewise, the use of legume microparticulates in edible snacks would increase the consumption of important nutrients by energy-hungry children, teens, and young adults and assist in mitigating some of the effects of white sugar and insufficient complex carbohydrates, such that sugars potential hyper-stimulating effect, as well as some sugar-based food cravings, may decrease. Legume microparticulates also can greatly reduce or eliminate the heavy feeling in the stomach and resultant sluggishness often associated with whole bean consumption, making legume consumption a smoother experience. And using legume microparticulates also saves consumer preparation time and fuel costs as compared to fresh whole beans, potentially increasing their appeal and use.

In the method of the present invention, raw whole legumes are milled into microparticulates and thereafter used in moist compositions like dough or beverages. Because of the size of the microparticulates, the digestive time of the legume portion of products made using the milled legumes is decreased while nutrient bioavailability and absorption are increased when compared to conventional home and commercial legume processing methods and compositions. In addition, legumes milled in accordance with the present invention may undergo more thorough digestion than processed legumes, increasing nutrient utilization. The process of the present invention also improves legume anthocyanin retention rates.

In the present invention, raw whole legumes are milled in their natural state with their hulls intact so as to preserve a greater percentage of their vital nutrients. In a preferred process of the present invention, legume flour is milled such that the particle size is approximately 1-500 micrometers, or 0.001 to 0.50 mm, or any other size that is small enough to pass through the pylorus, which transfers liquids and particles less than 1-2 mm in size into the duodenum. Specifically, by reducing particulate size, the process of the present invention improves gastric emptying rates, improves small intestine nutrient absorption rates, and improves small intestine nutrient absorption quantity. In addition, by using the process and products of the present invention, flatulence-causing resistant starches are reduced/removed while deactivating hemagglutinating lectins and avoiding unwanted starch gelatinization that can adversely affect the final product and its composition quality. Instead of causing flatulence, most of the starch contained within the legumes is digested normally prior to entering the colon so that it does not encounter the gas-producing bacteria residing therein. In addition, the process of the present invention substantially preserves metabolically valuable anthocyanin pigments.

The methods and compositions of the present invention avoid applying unnecessary added heat such as by boiling or steaming for the purpose of softening whole legumes or inactivating lectins in addition to the final stage of heating. For some products like leavened bread, rolls, and buns, the dough containing legume flour used to make the product is further formed into the product using conventional baking times and temperatures. For some products like Italian-style pasta, the dough used to make the product may be processed without the application of heat using cold extrusion. In such cases, lectins are deactivated when the product is cooked by consumers. For other products manufactured using extrusion like certain flatbreads like tortillas, vegetarian compositions including vegetarian meat, fish, crustaceans, mollusks, and fowl, and breakfast cereal-like compositions, as well as beverages, the present invention may use the minimum and maximum amount of time and heat within a temperature range preferably of 75-90° C., preferably for 5-30 minutes, the higher temperature being correlated with the shorter duration and the lower temperature being correlated with the longer duration, necessary to create the final product and optimize anthocyanin retention, reduce lectins, and prevent any unwanted gelatinization. Because the temperature at which gelatinization occurs may depend on the specific legume used, if gelatinization is undesirable, as in many beverages, temperatures and times will have to be adjusted to avoid or minimize it while simultaneously optimizing lectin deactivation and anthocyanin retention. In a preferred method of the present invention, doughs made from the legumes are extruded and kept warm at temperatures from 80 to 85° C. for 20 minutes or preferably 90° C. for 5 minutes. In a preferred method of the present invention for the same products when they are mixed rather than extruded as heated doughs, such as some tortillas, anthocyanin-rich legume flour thermal treatment and hydration employing most or all of a composition's aqueous component can occur simultaneously using this same method of heating for 80 to 85° C. for 20 minutes or preferably 90° C. for 5 minutes prior to combining with other ingredients in order to potentially increase the rate and quantity of lectin deactivation correlated with increased lectin molecule aqueous exposure, with heating at 80° C. for 20 minutes or 75° C. for 30 minutes the preferred method if gelatinization is undesirable. In a preferred method for a beverage containing legume flour, the anthocyanin-rich legume flour is hydrated and heated to 75° C. for 30 minutes or 80° C. for 20 minutes before being mixed with other beverage ingredients.

The present invention may deactivate lectins entirely, or at least to a point of insignificance, limit anthocyanin loss, and, in the case of a beverage, eliminate undesirable gelatinization. Without using a method of the present invention, legume products produced at temperatures that are too low, at durations that are too short, or that are prepared with insufficient aqueous exposure, will not deactivate the bulk of available lectins. Conversely, if the method of the present invention is not used, a percentage of anthocyanins will be destroyed in legume products produced at temperatures that are too high (even if it is heated for short periods up to a few minutes) or for too long (periods longer than a few minutes), to preserve sufficient anthocyanin content. In a method of the present invention, the microparticulate legume flours may be used to create baked goods like bread, rolls, buns, and pizza, which can be baked using conventional baking methods, such as, without limitation, baking the product at 325 to 375° F. for 40-45 minutes for bread, so that the flour does not need to be heated beforehand, as double heating of the flour may damage the anthocyanins and add unnecessary processing steps.

Thereafter, the final dough containing the milled anthocyanin-rich legume flour may be incorporated into breads, pasta, Asian noodles, buns, biscuits, rolls, crackers, muffins, flatbreads, Latin American flatbreads, tortillas, arepas, pupusa, torta, English, Scottish, and Irish flatbreads, English muffins, scones, bannock, farl, crispbreads, hardtack, Swedish flatbreads, tunnbröd, knäckebröd, Norwegian flatbreads, flatbrød, Finnish flatbreads, ruisreikäleipä, Italian flatbreads, focaccia, pizza, African flatbreads, Middle Eastern flatbreads, lavash, matzos, barbari, bazlama, pita, South Asian flatbreads, puri, roti, chapati, paratha, Southeast Asian flatbreads, laobing, other flatbreads not listed, bagels, mantou, wotou, ujeqe, Boston brown bread, dumplings, vegetarian meat, fish and seafood substitutes, tofu, breakfast cereal-like compositions, gruel, grits, cakes, cookies, doughnuts, pies, pastries, tortes, pretzels, snack chips, a potable beverage, and the like.

In making beverages using the microparticular legume flour, a well-saturated flour made out of black beans and water at a bean flour to water ratio of 1:3 or 1:4 to allow for full saturation, for example, the processing temperature is in the 75-80° C. range because gelatinization creates a thick, undesirable beverage texture. Gelatinization begins to occur somewhere between 80 and 85° C. This range of heat is applied for 20 minutes at 88° C. or 30 minutes at 75° C., and the mixture allowed to cool to room temperature if not optionally force-cooled more rapidly. The saturated, heated microparticulate flour is added to processed soybeans or other non-anthocyanin-containing beans and/or grains that are processed separately by typical commercial processes and cooled to room temperature or cooler so that when they are combined, they will not heat the separate anthocyanin-containing legumes and potentially decrease their anthocyanin content. At any point prior to combining the two liquids, the anthocyanin-containing legume liquid is processed with equipment such as a sharp blade for a period long enough and at a speed high enough, or alternatively filtered, if necessary to decrease the size of or remove any undesirable microparticulates if the end product is a smooth liquid free of particulate matter that would be detected by the ordinary consumer, such as to achieve a milk-like consistency. Alternatively, decreasing the size or removal of undesirable microparticulates may occur after blending the bean and other liquids. After or during the combination of the liquids, other ingredients such as flavoring and preservatives may be added according to the product desired.

In a preferred embodiment black beans (*Phaseolus vulgaris*) are used because of the high anthocyanin content. In a preferred embodiment of the present invention, the legumes that are milled are selected from anthocyanin-rich beans known as red and black kidney beans (*Phaseolus vulgaris*), small red beans (*Vigna umbellata*), red and black adzuki beans (*Vigna angularis*), black gram (*Vigna mungo*) (also known as urad dal in India), black lentils (*Lens culinaris*), black and scarlet runner beans (*Phaseolus coccineus*), cranberry beans (*Phaseolus vulgaris*), as well as white beans (which include navy, Great Northern, cannellini and white kidney), pinto beans, and any other beans rich in complex carbohydrates but not in anthocyanins, and/or any combination thereof. Also, in the present invention, the microparticulates may be strained or sifted to remove any large or undesirable particulates before using to improve the texture of the finished products.

While particular embodiments and methods of the present invention have been shown and illustrated herein, it will be understood that many changes, substitutions and modifications may be made by those persons skilled in the art. It will be appreciated from the above description of presently preferred embodiments and methods that other configurations and techniques are possible and within the scope of the present invention. Thus, the present invention is not intended to be limited to the particular embodiments and methods specifically discussed hereinabove.

What is claimed is:

1. A method for making an anthocyanin-rich beverage base, using raw whole legumes, which method substantially maintains the anthocyanins naturally present in the legumes and substantially eliminates the amount of lectins naturally present in the legumes, and which method excludes preheating the whole legumes comprising:
    Selecting raw whole legumes that are anthocyanin-rich which have been milled into microparticulate flour each particulate of flour being between 1-500 micrometers, or 0.001 to 0.05 mm in size;
    Mixing the milled microparticulate flour with a liquid until it is fully saturated;
    Processing the saturated flour at a temperature no higher than 99.9° C. for a period of time no less than 3 minutes or at a temperature of 75° C. for a period of time no less than 30 minutes or at a temperature between 75 and 99.9° C., whereby the higher the temperature, the shorter the duration, and the lower the temperature the longer the duration, the temperature and time being adjusted as set forth herein to prevent any unwanted gelatinization or retrogradation of the fully saturated mixture,
    whereby the anthocyanins and the complex carbohydrates in the legumes will be substantially maintained and the lectins naturally present in the legumes will be substantially eliminated in any beverage product made using the beverage base.

2. The method of claim 1, further comprising the additional step of removing undesirable microparticulates from the milled microparticulate flour to improve the texture of the anthocyanin-rich beverage product base.

3. The method of claim 1, wherein the raw whole anthocyanin-rich legumes that are milled are selected from one or more of the following group of anthocyanin-rich beans: *Phaseolus vulgaris, Vigna umbellate, Vigna angulans, Vigno mungo, Lens culinaris, Phaseolus coccineus*, and any combination thereof.

4. The flour of claim 1 wherein the milled flour is strained of undesirable microparticulates to improve texture of the products made using the flour.

5. The method of claim 1 further comprising the additional steps of mixing the legume flour with other ingredients and enough liquid to form a beverage prior to the processing step and ensuring that, after processing the mixture, the processed mixture is not subjected to additional heat and then cooling the mixture to limit anthocyanin loss in the beverage product.

6. A method for making anthocyanin-rich non-bread-like products having a hydrating or aqueous component and using raw whole legumes, which method substantially maintains the anthocyanins and substantially eliminates the lectins naturally present in the legumes, and which method excludes preheating the whole legumes comprising:
    Selecting raw whole legumes that are anthocyanin-rich which have been milled into microparticulate flour each particulate of flour being between 1-500 micrometers, or 0.001 to 0.05 mm in size;
    Mixing the milled microparticulate flour with the hydrating or aqueous component of the final non-bread-like product to create a dough;
    Heating the milled microparticulate hydrated flour so that it reaches a temperature range between 75 and 99.9° C. for approximately 3-30 minutes, wherein the higher the temperature, the shorter the duration, and the lower the temperature the longer the duration so long as the temperature and duration are adjusted to prevent any unwanted gelatinization or retrogradation of the fully saturated mixture;
    Adding in any other ingredients to the dough that are required to make the non-bread like product; and
    Extruding the dough to create the non-bread-like product,
    Whereby a complex carbohydrate-rich anthocyanin-rich non-bread-like product which substantially maintains the anthocyanins and substantially eliminates the lectins present in the legumes is created.

7. The method of claim 6, wherein the milled microparticulate flour is strained of undesirable microparticulates to improve the texture of the anthocyanin-rich non-bread-like product.

8. The method of claim 6, whereby the legume flour that has been mixed with other ingredients is cooked or thermally treated for approximately 5-30 minutes, in order to deactivate phytohemaglutinins naturally occurring in the flour and then optionally force cooling the mixture to a desired temperature to substantially eliminate anthocyanin loss.

9. A method for making anthocyanin-rich bread and bread-like products using whole raw legumes, which method substantially maintains the anthocyanins found within the raw legumes and substantially eliminates the lectins naturally present in the legumes, and which method excludes pre-heating the whole legumes, comprising:
    Selecting raw whole legumes that are anthocyanin-rich which have been milled into microparticulate flour each particulate of flour being between 1-500 micrometers, or 0.001 to 0.05 mm in size;
    Mixing the milled microparticulate flour with other ingredients according to recipes well known in the art to create a bread or bread-like product to create a dough and baking the dough according to conventional baking methods, whereby that a anthocyanin-rich bread or bread-like product which maintains the anthocyanins and reduces the lectins present in the legumes and provides a complex carbohydrate-rich bread and bread-like product is created.

10. The method of claim 9, wherein the milled microparticulate flour is strained of undesirable microparticulates to improve the texture of the anthocyanin-rich bread and bread-like product prior to mixing with the other ingredients.

11. The method of claim 9, whereby the legume flour that has been mixed with other ingredients is thermally treated for 5-45 minutes in order to substantially deactivate phytohemaglutinins naturally occurring in the flour and then optionally force cooling the mixture to limit anthocyanin loss.

12. The method of claim 9 whereby the legume flour that has been mixed with other ingredients is heated at a temperature between 100 and 115° C.

13. The method of claim 9 whereby the legume flour that has been mixed with other ingredients is heated at a temperature between 115 and 140° C.

* * * * *